United States Patent Office 3,836,633
Patented Sept. 17, 1974

3,836,633
PROCESS FOR THE PRODUCTION OF COPPER SILICATES
Helmut Beschke, Grossauheim, Germany, assignor to Deutsche Gold- und Silber-Scheideanstalt vormals Roessler, Frankfurt am Main, Germany
No Drawing. Filed July 20, 1971, Ser. No. 164,428
Claims priority, application Germany, July 23, 1970, P 20 36 554.2
Int. Cl. C01b 33/20
U.S. Cl. 423—326     8 Claims

ABSTRACT OF THE DISCLOSURE

A process for the production of a copper silicate by precipitation of the silicate from a reaction medium consisting essentially of an aqueous solution of an alkali silicate and a copper salt, wherein the improvement comprises precipitating the copper silicate from the solution at an elevated temperature. The copper silicates are useful as additives to coatings such as paints, and especially as anti-fouling agents in coatings for ships.

---

The invention relates to an improved process for the production of copper silicates through precipitation of alkali silicate and copper salt from aqueous solutions.

It has been known that upon addition of an aqueous solution of copper-(II)-sulfate to water glass, a precipitate of a copper silicate of varying composition forms (Gmelin, Vol. 60 B [1961], pages 899–902). The precipitate as a suspension is a gel, and is sufficient to filter from the reaction mass. (Paul E. Gagnon and others, Can. I. Research 19, B [1941], pages 179–204.) Foreign ions are held doggedly in this suspension, so that removal of the ions by washing is extremely difficult.

In order to find a technically usable way to obtain copper silicates free of foreign ions, different methods have been used. German federal Pat. 1,117,553 describes a process in which water glass is reacted directly with solid copper sulfate ($CuSO_4 \times 5H_2O$), whereby a dry reaction product is obtained. This process, in which the reaction of a solution (water glass) with a solid (copper sulfate) is to lead to a dry product, necessarily contains various inhomogeneous reaction conditions which must lead to an inhomogeneous product. Thus, it is uncertain whether in the reaction mixture, which continuously becomes more dry, all the copper sulfate actually is reacted, since indeed no homogeneous solution of the reaction partners can be produced despite a thorough mixing. In addition, an inhomogeneous reaction product is produced in which, for example, the content of copper, the surface of the product and the structure of the particles varies. Beyond that, the reaction of larger quantities of substance at an industrial scale causes considerable difficulty.

British Pat. 357,993 describes a process to obtain gel free, finely distributed, easily filterable, opaque silicic acid with a low bulk weight and a low alkali content from residues of the acid treatment of silicate-like substances by treatment of said substances with a hot alkali carbonate solution, filtering off anything that has not been dissolved thereby, subsequent precipitation of the silicic acid by cooling the filtrate to a temperature slightly above the crystallization point of the alkali carbonate, as well as subsequent filtering washing and drying.

British Pat. 442,664 describes the production of complex hydrated copper silicate adsorbed on silicic acid, by boiling the combined aqueous suspension of silicic acid produced according to British Pat. 357,993 and a precipitated basic copper compound. According to a variation of this process, soluble copper salt is added to the aqueous suspension of the pertinent silicic acid, the latter then is precipitated by means of addition of alkali and then is boiled. According to another variation of the process, the aqueous suspension of the above mentioned silicic acid is mixed with alkali, then an appropriate quantity of soluble copper salt is added, whereby copper is deposited again as a basic copper compound and then is boiled.

This known process consists of boiling two solid substances suspended in water, namely, a flocculated silicic acid having a low alkali content and a basic copper compound. No reproducible uniform end product can be achieved with this process due to aging the precipitate of the copper containing compound, and the lack of effective contact between the solid substances which are reacted.

German Pat. 950,063 describes a process in which, first of all, an alkaline earth silicate is obtained from water glass, and from this subsequently, by reaction with a copper salt solution, a copper silicate is obtained. At the same time the previously mentioned difficulties during production and isolation of metal silicate precipitations are encountered. However, the reference mentions means to overcome these difficulties. These consist in the freezing and thawing of the filter cake, and subsequent washing with alcohol and water.

It now has been found that in a simple way one can obtain readily filterable copper silicates that can be processed further, of a reproducible composition, by precipitating copper silicate from homogeneous aqueous solutions of alkali silicate and copper salt, whereby the precipitation is carried out at elevated temperatures, preferably at about 50°–95° C., especially at about 75°–90° C.

For example, if one operates at a precipitation temperature of about 85° C., then the precipitation suspension is preferably well stirred during the entire precipitation; no gel is formed and the sucking off and washing out of foreign ions will cause no difficulties. If, on the other hand, the same precipitation is carried out at room temperature, then the suspension will congeal into a solid, even after addition of half the quantity of copper sulfate, which will hold large quantities of water, and which therefore is difficult to filter.

For the double reaction with copper salt solutions, aqueous solutions of alkali silicates can be used. A preferred alkali silicate is commercially available water glass. The ratio between $Na_2O$ and $SiO_2$ in the water glass is preferably about 1:1 to about 1:12. The other alkali silicates can also be used. A particularly preferred copper salt is copper sulfate. Other copper salts which enter into the double reaction can also be used, and are well known to those skilled in the art. See, for example, the previously mentioned references.

The copper content of the precipitated copper silicate is adjustable. In this case one can proceed in such a way that, first of all, the alkali content of the alkali silicate required for stoichiometric reaction of the copper salt is adjusted by addition of acid or base and then a sufficient amount of copper salt solution is added until the precipitate suspension has a pH of about 6. In the case of this method of operation, one can also simultaneously add copper salt solution and acid to the alkali silicate solution.

According to another variation of the process, provision has been made to adjust the copper content of the copper silicate by adding to an alkali silicate solution, containing more than the quantity of alkali required stoichiometrically for the reaction of the copper salt, the copper silicate by adding to an alkali silicate solution, about pH 6.

Preferably, precipitation is carried out with vigorous agitaton of the aqueous solution. The filterability of the copper silicate precipitate can be improved further by subsequently stirring the precipitate suspension for a short time still at precipitation temperature, for example, for about 30–60 minutes, then filtering off the precipitate, washing it until free of salt with water, drying it and possibly grinding it.

However, one can also let the precipitate suspension cool off while subsequently stirring and afterwards filtering it.

In the previously described process a double reaction occurs, that is, one reaction between the copper ion of the copper salt used and the silicate ions of the water glass, as well as a reaction between the anion of the copper salt and the alkali metal of the water glass. Any development of copper silicates or basic copper compounds drawn adsorptively on distinct silicic acid particles is impossible, since, in the final analysis, only as much copper ion is used as there is silicate ion available for the reaction. The products of this invention have been proven to be eminently suitable as additives to coatings such as paints, and especially as anti-fouling agents in coatings on ships.

EXAMPLE 1

To a 50 liter jar with electric heater and with agitator, 6.32 kg. (4.68 liters) water glass (ratio $Na_2O:SiO_2 = 1:3.45$) and 19 liters water are added and are heated to 85° C. A solution of 2.05 kg. of an industrial quality copper sulfate ($CuSO_4 \times 5H_2O$) in water, filled up to 12.5 liters of solution, is added continuously for about 30 minutes with further heating of the mixture while stirring vigorously. At the same time, the temperature of 85° C. is mainained in the precipitate suspension. With the help of indicator paper, the pH of the suspension is measured during the precipitation reaction, and upon reaching a pH of 6, addition of copper sulfate solution is stopped. 400 ml. copper sulfate solution are left over. The precipitate suspension is stirred for an additional 30 minutes without further heating, it then is sucked off, washed with water until free of salt and dried at 140° C. in a ventilated drying closet until it reaches a constant weight. The dried material is ground with the aid of a pinned disk mill. 2,475 g. copper silicate are obtained. The analytical data are: residue on ignition: (91.00%; Cu content: 19.4%. The loose bulk weight lies at 250 b./l. The tamped weight at 385 g./l. the oil requirement amounts to 140%. The BET surface lies at 330 m.²/g., the size of the primary particles amounts to 5 to 20 millimicrons and the particle size of the agglomerates lies below 10 microns.

EXAMPLE 2

A solution consisting of 3.34 kg. water glass (ratio $Na_2O:SiO_2 = 1:3.45$) and 10 liters water is heated to 85° C. and is reacted for 25 minutes while stirring with a continuously added solution consisting of 293 g. copper sulfate ($CuSo_4 \times 5H_2O$), 186 ml. concentrated sulfuric acid and 2 liters water. The process of addition is stopped upon reaching a pH=6. This pH is reached after addition of about 1.80 liters of the above mentioned copper sulfate containing solution. After that, stirring is continued for about 30 minutes at 85° C., then it is sucked off, washed with water until free of sulfate and dried at 140° C. in a ventilated drying closet until it reaches a constant weight. The substance is ground in a pinned disk mill. One obtains 1020 g. copper silicate with the following analytical data: residue on ignition: 93.4%; content of copper: 6.23%; loose bulk weight. 238 g./l.; tamped weight: 334 g./l.; oil requirement: 135%.

EXAMPLE 3

1285 ml. of a solution consisting of 214.5 copper sulfate ($CuSO_4 \times 5H_2O$), in water, are added drop by drop while stirring at 85° C. for 30 minutes to a solution consisting of 200 g. water glass, 650 ml. water and 47.2 g. caustic soda. Stirring is continued subsequently at 85° C. for 30 minutes, then it is sucked off, washed with water until free of sulfate and dried at 140° C. One obtains 127.6 g. of a copper silicate with the following data:

| | | |
|---|---|---|
| Residue on ignition | percent | 88.4 |
| Copper content | do | 37.6 |
| BET surface | m.²/g. | 485 |
| Size of primary particles | millimicrons | 5–20 |
| Size of agglomerates | microns | 5 |

EXAMPLE 4

In a 50 liter jar with electric heating system and agitator, 6.32 kg. (4.68 liters) water glass (ratio $Na_2O:SiO_2=1:3.45$) and 19 liters water are inserted and heated to 85° C. A solution of 1.46 kg. sulfate ($CuSO_4 \times 5H_2O$) of industrial quality in water, filled in until there are 9 liters of solution, is added while heating the mixture continuously for 20 minutes and while stirring vigorously. At the same time, the temperature of 85° C. is maintained in the reaction medium. The pH of the suspension is followed during the precipitation with the aid of indicator paper, it stops at first at the value 12 and, prior to using up the entire copper sulfate solution, it reaches the value of 10.5 At this point the addition of copper solution is stopped. About 300 ml. are left over. By addition of a 50% aqueous sulfuric acid, the pH value is then adjusted to 6 within about 10 minutes, about 185 g. sodium hydroxide being needed for this purpose. Subsequently, one continues to stir without heating for another 30 minutes, one then sucks off, washes with water until free of sulfate and dries at 140°° C. in the ventilated drying closet until a constant weight is reached. The dried material is ground in a pinned disk mill. 2305 g. copper silicate are obtained. The analytical data are:

| | Percent |
|---|---|
| Residue on ignition | 91.5 |
| Cu content | 15.3 |

The loose bulk weight is 280 g./l. the tamped weight is 390 g./l. The oil requirement is 170%. The BET surface is 310 m.²/g. The size of the primary particles amounts to about 5 to 20 millimicrons; the particle size of the agglomerates is about 10 microns.

I claim:

1. A process for the production of copper silicate agglomerated particles by precipitation of the silicate from a reaction medium consisting essentially of an aqueous solution of sodium silicate and an organic copper salt, wherein the improvement comprises precipitating the copper silicate from the solution at a pH of about 6 and at elevated temperatures of about 50 to 95° C. with vigorous agitation, so that no gel is formed, and filtering said copper silicate, which copper silicate is filterable since no gel is formed, and said copper silicate essentially consisting of copper silicate primary particles of 5–20 millimicrons in size and the size of the agglomerates being about 5–10 microns.

2. Process of Claim 1 in which the temperature is about 75°–95° C., and the particle size of the agglomerates of precipitated copper silicate is about 10 microns.

3. Process of Claim 1 wherein the alkali metal silicate is water glass having a weight ratio of $Na_2O$ to $SiO_2$ of about 1:1 to about 1:12.

4. Process of claim 3 consisting essentially of controlling copper content of the copper silicate by adjusting the alkali content of the alkali metal silicate required for stoichiometric reaction of the copper salt by addition of acid or base and then adding a sufficient amount of copper salt solution until the precipitate suspension has a pH of about 6.

5. Process of claim 4 in which copper salt solution and acid are added simultaneously to the alkali metal silicate solution.

6. Process of claim 3 consisting essentially of controlling copper content of the copper silicate by adding to the alkali metal silicate solution containing more than the quantity of alkali required stoichiometrically for the reaction of the copper salt the copper as a copper salt solution and then acidifying to about pH 6.

7. A process for the production of copper silicate agglomerated particles by precipitation of the silicate from a reaction medium consisting essentially of an aqueous solution of sodium silicate and an inorganic copper salt, wherein the improvment comprises precipitating copper silicate from a solution at a pH of about 6 and a temperature of about 50 to 95° C. with vigorous stirring, so that no gel is formed in the reaction medium and stirring the reaction medium at about 75 to 95° C. for about 30 to 60 minutes after completion of precipitation, filtering the resulting precipitate, which is filterable since no gel was formed in the reaction medium, washing the precipitate with water and drying the washed precipitate, and said copper silicate essentially consisting of copper silicate primary particles of 5–20 millimicrons in size and the size of the agglomerates being about 5–10 microns.

8. Process of Claim 7 in which the reaction medium is cooled while stirring before filtering.

References Cited

FOREIGN PATENTS

| | | | |
|---|---|---|---|
| 950,063 | 10/1956 | Germany | 23—110 R |
| 1,117,553 | 11/1961 | Germany | 23—110 R |
| 1,164,996 | 3/1964 | Germany | 23—110 R |
| 143,784 | 1962 | U.S.S.R. | 23—110 R |

OTHER REFERENCES

Chemical Abstracts, Vol. 53, 1959, page 2555.

EDWARD STERN, Primary Examiner

U.S. Cl. X.R.

106—288 B; 423—43, 604